US007739262B2

(12) United States Patent
Larson et al.

(10) Patent No.: US 7,739,262 B2
(45) Date of Patent: Jun. 15, 2010

(54) ENFORCING CURRENCY AND CONSISTENCY CONSTRAINTS IN DATABASE QUERY PROCESSING

(75) Inventors: Per-Åke Larson, Redmond, WA (US); Jonathan David Goldstein, Kirkland, WA (US); Raghu Ramakrishnan, Madison, WI (US); Hongfei Guo, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 1464 days.

(21) Appl. No.: 10/805,083

(22) Filed: Mar. 19, 2004

(65) Prior Publication Data
US 2005/0210010 A1 Sep. 22, 2005

(51) Int. Cl.
*G06F 17/30* (2006.01)
(52) U.S. Cl. ........................ 707/713; 707/718
(58) Field of Classification Search ............. 707/3–5
See application file for complete search history.

(56) References Cited

U.S. PATENT DOCUMENTS

| | | | | |
|---|---|---|---|---|
| 5,517,658 | A | * | 5/1996 | Gluss et al. ............ 716/6 |
| 6,088,524 | A | * | 7/2000 | Levy et al. ............ 707/3 |
| 2001/0049685 | A1 | * | 12/2001 | Carey et al. ........ 707/103 R |

OTHER PUBLICATIONS

R. Alonso, D. Barbará, H. Garcia-Molina, and S. Abad. *Quasi-copies: Efficient Data Sharing For Information Retrieval Systems*. in EDBT, 1988.

M. Altinel, C. Bornhövd, S. Krishnamurthy, C. Mohan, H. Pirahesh, and B. Reinwald. *Cache Tables: Paving The Way For An Adaptive Database Cache*. in VLDB, 2003.

C. Bornhövd, M. Altinel, S. Krishnamurthy, C, Mohan, H. Pirahesh, and B. Reinwald. *Dbcache: Middle-Tier Database Caching For Highly Scalable E-Business Architectures*. in SIGMOD, 2003.

D. Barbará and H. Garcia-Molina. *The Demarcation Protocol: A Technique For Maintaining Constraints In Distributed Database Systems*. in EDBT, 1992.

L. Bright and L. Raschid. *Using Latency-Recency Profiles for Data Delivery on the Web*. In Proc. in VLDD, 2002.

A. Gal. *Obsolescent Materialized Views in Query Processing of Enterprise Information Systems*. in CIKM, 1999.

H. Garcia-Molina and G. Wiederhold, *Read-Only Transactions In A Distributed Database*. in TODS, 1982.

R. Gallersdörfer and M. Nicola, *Improving Performance In Replicated Databases Through Relaxed Coherency*. in VLDB, 1995.

(Continued)

*Primary Examiner*—Charles Rones
*Assistant Examiner*—Belix M Ortiz

(57) ABSTRACT

Currency and consistency requirements are specified as part of a query against a database that may contain replicated data that is updated asynchronously and therefore may not be completely up to date. The database system constructs query execution plans that include an input selection operator that verifies the currency of a replica and selects a subplan using the replica for execution only when the replica meets the query's currency constraints. It checks possible query execution plans at construction time against the query's consistency constraints and any plans that may produce a result not meeting the consistency constraints are rejected. In this way, the query result is guaranteed to satisfy the query's currency and consistency requirements.

33 Claims, 6 Drawing Sheets

OTHER PUBLICATIONS

J. Goldstein and P. Larson. *Optimizing Queries Using Materialized Views: A Practical, Scalable Solution.* in SIGMOD, 2001.

Y. Huang, R. Sloan, and O. Wolfson. *Divergence Caching in Client Server Architectures.* in PDIS, 1994.

P. Larson, J. Goldstein, and J. Zhou. *Transparent Mid-Tier Database Caching In SQL Server.* in SIGMOD, 2003.

P. Larson, J. Goldstein, and J. Zhou. *MTCache: Transparent Mid-Tier Database Caching in SQL Server.* in ICDE, 2004.

A. Labrinidis and N. Roussopoulos. *Balancing Performance And Data Freshness In Web Database Servers.* in VLDS, 2003.

C. Olston, B. Loo, and J. Widom. *Adaptive Precision Setting for Cached Approximate Values.* in SIGMOD, 2001.

C. Olston and J. Widom. *Offering A Precision Performance Tradeoff For Aggregation Queries Over Replicated Data.* in VLDB, 2000.

C. Pu and A. Left. *Replica Control In Distributed Systems: An Asynchronous Approach.* in SIGMOD, 1991.

U. Röhm, K. Böhm, H. Schek, and H. Schuldt. *FAS—A Freshness-Sensitive Coordination Middleware for a Cluster of OLAP Components.* in VLDB, 2002.

A. Segev and W. Fang. *Currency-based Updates To Distributed Materialized Views,* in ICDE, 1990.

L. Seligman and L. Kerschberg. *A Mediator For Approximate Consistency. Supporting "Good Enough" Materialized Views.* in JIIS, 8(3):203-225, 1997.

A. Sheth and M. Rusinkiewicz. *Management Of Independent Data: Specifying Dependency And Consistency Requirements.* in Workshop on the Management of Replicated Data, pp. 133-136, 1990.

G. Wiederhold and X. Qian. *Modeling Asynchrony in Distributed Databases.* in ICDE, 1987.

O. Wolfson, B. Xu, S. Chamberlain, and L. Jiang. *Moving Objects Databases: Issues And Solutions.* in Statistical and Scientific Database Management, pp. 111-122, 1998.

H. Yu and A. Vahdat. *Efficient Numerical Error Bounding For Replicated Network Services,* in VLDB, 2000.

* cited by examiner

|  | cid | interval | delay | views |
|---|---|---|---|---|
| CR1 | 1 | 15 | 5 | orders_prj |
| CR2 | 2 | 10 | 5 | cust_prj |

Fig.6a

S1: SELECT c_custkey, c_name, o_orderkey, o_totalprice
    FROM from customer, orders
    WHERE c_custkey = o_custkey [AND c_custkey<$K]
    [CURRENCY clause]

S2: SELECT c_custkey, c_name FROM customer
    WHERE c_acctbal between $A and $B
    CURRENCY BOUND 10 on (customer)

Fig.6b

Q1: $K = 500                                                          P1
Q2: No range predicate; no currency clause                            P2
Q3: $K = 500; BOUND 10 ON (customer, orders)                          P1
Q4: $K = 500; BOUND 2 ON (customer), BOUND 20 on (orders)             P4
Q5: $K = 500; BOUND 10 ON (customer), BOUND 20 on (orders)            P5
Q6: $A = 100; $B = 105                                                P1
Q7: $A = 100; $B = 110                                                P3

Fig.6c

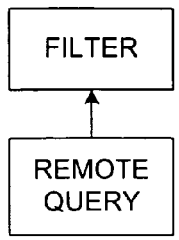
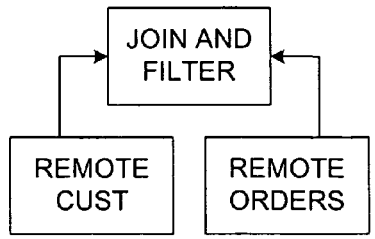
Fig.7a  Fig.7b
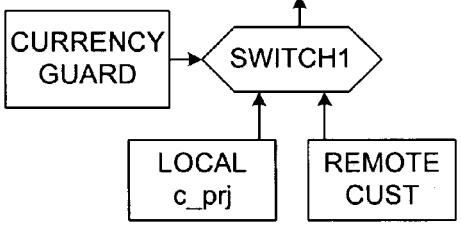
Fig.7c
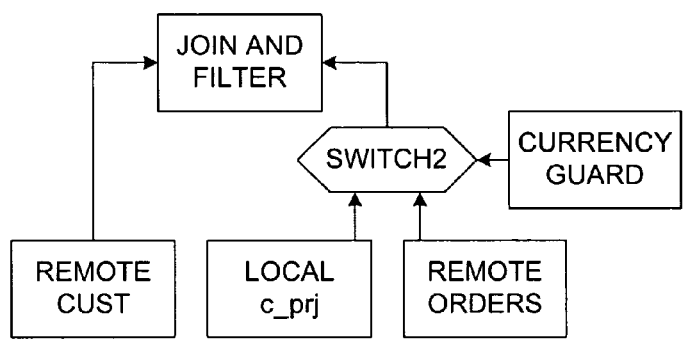
Fig.7d
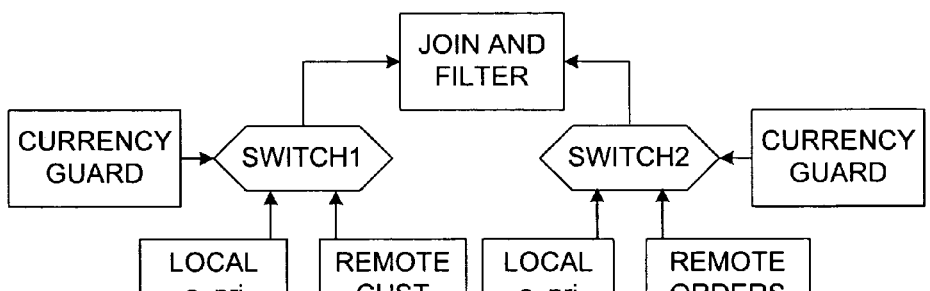
Fig.7e

ENFORCING CURRENCY AND CONSISTENCY CONSTRAINTS IN DATABASE QUERY PROCESSING

TECHNICAL FIELD

The invention concerns generally the field of database query processing and more specifically the field of utilizing replicated and cached data during query processing while providing currency and consistency guarantees on query results.

BACKGROUND OF THE INVENTION

Many application systems today make use of various forms of asynchronously updated replicas, which are saved data derived from some underlying source tables, to improve scalability, availability and performance. The term replica can mean traditional replicated data and data cached by various caching mechanisms. "Asynchronously updated" means that the replica is not updated as part of a database transaction modifying its source tables; so that the state of the replica does not necessarily reflect the current state of the database. While the use of replicated data greatly enhances performance in many cases queries are still unnecessarily routed to a backend server due to uncertainty about the currency and consistency requirements of the query as well as the currency and consistency of the replicated data.

If an application uses replicas that are not in sync with the source data, it is clearly willing to accept results that are not completely current but, most likely, the application has some limits on the acceptable "age" of the data. Today, these currency requirements are not explicitly declared anywhere but can only be indirectly inferred from the properties of the replica used. The following example illustrates this approach.

An application that queries a replicated table that propagates updates every 30 seconds is implicitly saying that it is willing to accept data that is up to 30 seconds old. If the replication is later reconfigured to propagate updates every 5 minutes, it is necessary to determine if 5 minute old data still meets the currency requirements of the query. Today's systems cannot provide any assistance in making this determination because they have no way of knowing what a given query's currency requirements are.

Data currency requirements are currently expressed implicitly through the choice of data sources for queries. For example, if a query Q1 does not require completely up-to-data data, the application may be designed to submit the query to a database server C that stores replicated data instead of submitting it to database server B that maintains the up-to-date state. Another query Q2 access the same tables but requires up-to-date data so the application submits it to database server B. The routing decisions are hardwired into the application and cannot be changed without changing the application.

Recent work has addressed peripherally some of the issues surrounding currency and consistency requirements in database query processing. For example, Epsilon-Serializability allows queries to specify inconsistency bounds but the purpose is entirely different. The objective is to achieve higher degree of concurrency by allowing queries to see database states with bounded database divergence introduced by concurrent update transactions.

WebViews suggests algorithms for the online view selection problem considering a new constraint—the required average freshness of the cached query results. The model of freshness is relatively coarse and the use is purely heuristic, providing no guarantee on currency and consistency of the result of an individual query.

Recent work with obsolescent materialized views deal with determining whether to use local or remote data by integrating the divergence of local data into the cost model for the database system's query optimizer. The usage of currency information is heuristic, the staler the data is, the higher the cost added to the plan. A related approach formulates a heuristic function that is simply the comparison of a user specified threshold and a weighted score calculated from a single view. No guarantees on the currency or consistency of the result of an individual query are provided.

SUMMARY OF THE INVENTION

A user can explicitly specify certain currency and consistency requirements on a database query and the system provided ensures that the requirements are met. Possible query execution plans are constructed that include an subplan selection operator that verifies the currency of a replicated data source at run time and selects the subplan that uses the replicated data source if it meets the query's currency constraints. Query execution plans are verified, during construction, against the query's consistency constraints and any plans that do not meet the consistency constraint are rejected. The approach allows queries to utilize replicated data sources with confidence in the quality of the query result, enabling more efficient evaluation of queries and better utilization of replicated data sources.

In the described embodiment, a plurality of currency and consistency constraints associated with the database query are normalized into a single currency and consistency constraint by taking a union of the constraints and computing their least upper bound. The replicated local data is divided into currency regions where each region contains a set of replicas that are transactionally consistent and always reflect the same committed state of their source database. A heartbeat mechanism is used to keep track of the currency of the replicas in each currency region.

These and other objects of the invention will become understood from a detailed description of an exemplary embodiment of the invention which is described in conjunction with the accompanying drawings.

BRIEF DESCRIPTION OF THE DRAWINGS

FIGS. 6a-6c illustrate currency region settings, query schemas, and query variants used in a example that illustrates an embodiment of the present invention; and FIGS. 7a-7e illustrate query plans that are generated as part of the example illustrated in FIG. 6.

DETAILED DESCRIPTION OF A THE INVENTION

Figure 2:
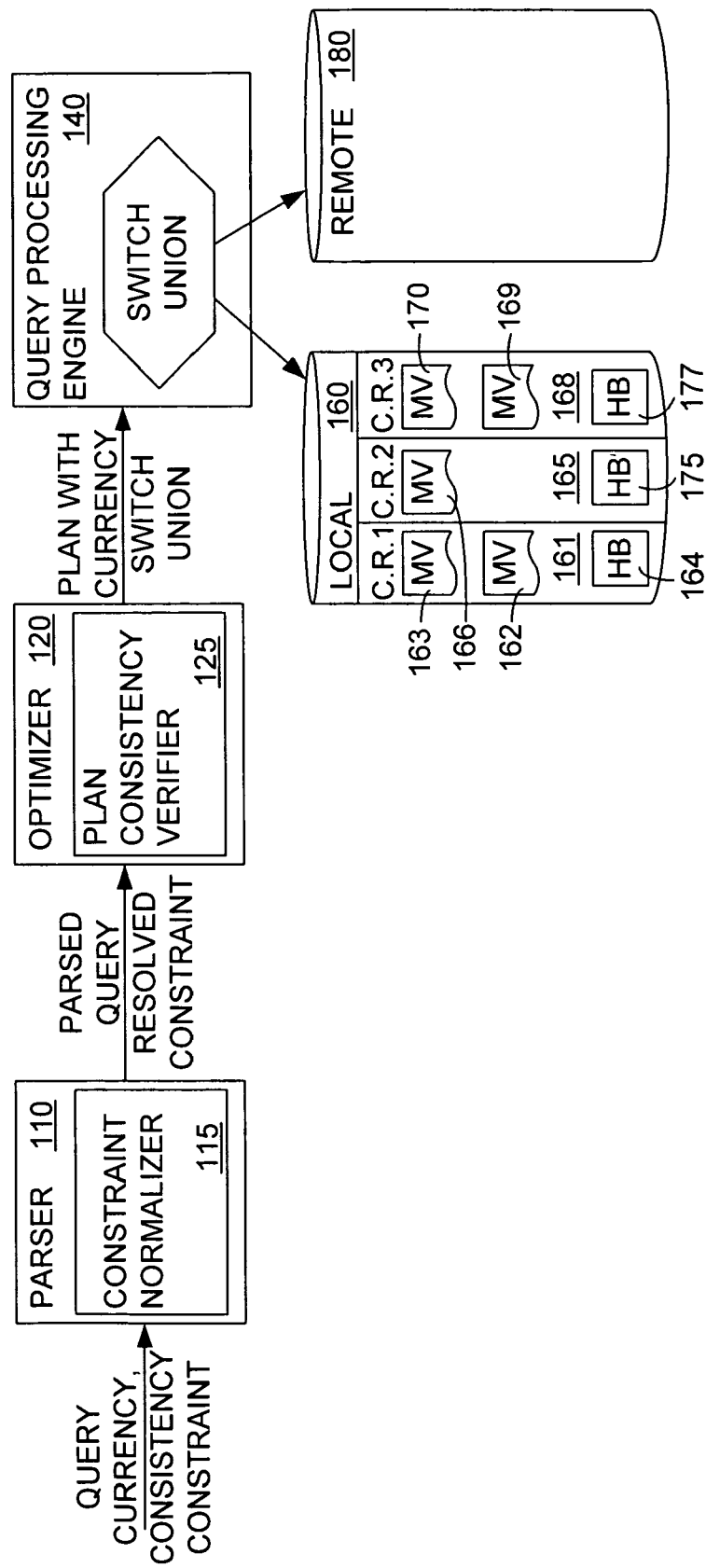
FIG. 2 is a functional block diagram of database system that includes a system for specifying and enforcing currency and consistency according to one embodiment of the present invention.

FIG. 2 is a functional overview of a system for specifying and enforcing currency and consistency requirements of a query within a database system. A query processing system 100 includes a parser 110, a query optimizer 120, and a query processing engine 140. A local data source 160 containing a set of asynchronously updated replicas (tables or materialized views) from a backend or remote data source 180 is available to the query processing engine 140 for execution of database queries. Currency and consistency constraints are specified as part of the query and are parsed by the query parser 110. A constraint normalizer 115 resolves a plurality of constraints into a single normalized constraint that is passed as part of the parsed query to the query optimizer 120.

A plan consistency verifier 125 evaluates possible query execution plans and rejects any plans that do not meet the consistency requirement. In addition, whenever a plan uses a local replica, the query optimizer includes in the plan a sub-plan selection operator that verifies the currency of the local replica before use. If the local replica does not satisfy the query's currency requirements, the operator switches to an alternative subplan that, preferably, retrieves the required data from the backend data source, but other corrective actions are possible. This alternative subplan, also called the fallback plan, is included in the overall query execution plan. The advantages to having the ability to specify currency and consistency requirements as part of a query are illustrated in the following scenarios.

A database containing replicated data propagated from another database that uses industry standard (asynchronous) database replication can easily keep track of how current the data is but today that information is not exploited. If an application states its currency requirements, the system could detect and take action when the application's requirements are not satisfied. Possible actions include simply logging the violation, returning the data but with an error code, or aborting the request.

A backend database server that is getting overloaded could reduce the query load by replicating part of the database to other database servers that act as caches. When a cache server receives a query, it attempts to answer it from the local data and if that is not possible it forwards the query transparently to the backend server. In this scenario, it is important to know the currency and consistency requirements of a query so the cache server can decide whether local data can be used or not.

In another scenario, a component may be able to cache SQL query results in some form so that they can be re-used later if the same query is submitted. It is unimportant exactly where the cache component runs or in what form the result is cached. The cache can keep track of the age of its cached results and if a result does not satisfy a query's currency requirements, the cache can transparently recompute the result.

Specifying Currency and Consistency Constraints

The terms currency and consistency constraints, as used in this description, will be defined in conjunction with this example. A database has two tables, Books and Reviews. The Books table stores information about books offered and the Reviews table contains book reviews submitted by customers. The tables are managed by a database server BE.

Replicated data or the result of a query computed from replicated data may or may not be completely up to date. Currency refers to how current or up-to-date a set of rows (or a table, a view, or a query result) are known to be. If a replicated table BooksCopy is refreshed once every hour, the currency of the BooksCopy is the elapsed time from the last refresh.

Another table, ReviewsCopy, may also be refreshed once every hour. The state of BooksCopy corresponds to some snapshot of the database on BE and similarly for Reviews-Copy. However, the states of the two replicas do not necessarily correspond to the same snapshot. If they do, it can be said that they are (transactionally) consistent or that they belong to the same consistency group. Whether or not the two replicas are mutually consistent depends entirely on their update policy.

Referring again to FIG. 2, a simplified block diagram of a query processing system is illustrated. A query is received by a parser 110 that parses the query and produces a query form that is used internally. To express currency and consistency constraints, it is assumed that a currency clause is added to SQL queries. The new clause follows the same scoping rules as the WHERE clause, that is, it can reference tables defined in the current or in outer SELECT FOR WHERE blocks. The following join query Q1 illustrates different forms of the currency clause and their semantics. The query is a join of Books and Reviews.

| Q1: | SELECT | ... |
|---|---|---|
| | FROM | Books B, Review R |
| | WHERE | B.isbn = R.isbn and B.title = "Databases" |

The following currency clause could be appended to Q1:

| E1: | CURRENCY BOUND | 10 min ON (B,R) |
|---|---|---|

Currency clause E1 expresses two constraints: a) inputs cannot be more than 10 minutes out of date and b) the state of the two input tables must be consistent, that is, be from the same database snapshot. In that case, it can be said that B and R belong to the same consistency class. If there are cached replicas of Books and Reviews and the query is computed from the replicas, to satisfy the constraint the result obtained using the replicas must be equivalent to the result that would be obtained if the query were computed against snapshots of Books and Reviews, taken from the same database state, that are not older than 10 minutes when execution of the query begins.

Alternatively, currency clause E2 could be appended to Q1:

| E2: | CURRENCY BOUND | 10 min ON (B), 30 min ON (R) |
|---|---|---|

Currency clause E2 relaxes the bound on to 30 minutes and it no longer requires that the tables be mutually consistent because they are placed in different consistency classes. A currency clause is hence constructed by first specifying a bound for each input and then forming consistency classes by deciding which inputs must be mutually consistent. E2 requires that every Books row and Reviews row must be from the same snapshot, which may be stricter than necessary. It is possible that it is acceptable if rows or groups of rows from the same table are from different snapshots.

Currency clause E3 could be appended to Q1:

| E3: | CURRENCY CLAUSE | 10 min ON (B) by B.isbn, |
|---|---|---|
| | | 30 min ON (R) by R.isbn |

It is assumed that isbn is a unique key of Books. E3 allows each row of the Books table to originate from different snapshots (because B.isbn is unique). The phrase "R by R.isbn" has the following meaning: if the rows in Reviews are grouped (partitioned) on isbn, rows within the same group must originate from the same snapshot. It should be noted that a Books row and the Review rows it joins with may be from different snapshots (because Books and Reviews are in different consistency classes). The currency clause E4 could be appended to Q1:

---
E4: CURRENCY BOUND    10 min on (B,R) BY B.isbn
---

E4 requires that each Books row be consistent with the Reviews rows that it joins with.

In summary a currency and consistency constraint consists of a set of triples where each triple specifies 1) a currency bound; 2) a set of tables forming a consistency class: and 3) a set of columns defining how to group the rows of the consistency class into consistency groups.

A SQL query may consist of multiple SELECT-FOR-WHERE blocks. Currency and consistency constraints are not restricted to the outermost block of a query—any SELECT FROM WHERE block can have a currency and consistency constraint. If a query contains multiple currency constraints, all constraints must be satisfied. A constraint normalizer 115 shown in FIG. 2 as part of the parser 100 resolves multiple currency constraints into a single constraint as follows. Given an additional table Sales in the running books database example, the following query illustrates this point.

---
```
Select   ...
From Sales S,
     (Select   ...
        From Books B, Reviews R
        Where R.isbn = R.isbn
        Currency bound 5 min on (B,R)
     )   T
Where    S. isbn = T.isbn
     And date = '10-1-2003'
Currency bound 10 min on (S,T)
```
---

Whatever input data the query is computed from, the inputs must be such that both currency and consistency constraints are satisfied. The outer currency clause states that S must be from the same snapshot as T. But T is computed from B and R, which implies that S, B, and R must all be from the same snapshot. If they are from the same snapshot, they all must have the same age. To satisfy both constraints, the age must be no more than 5 minutes. In summary, the least restrictive constraint that the inputs must satisfy is "5 min (S,B,R)", which is the least upper bound of the two constraints.

For subqueries in clauses other than the FROM clause, it should be decided whether the inputs defined in the subquery need to be consistent with any of the inputs in an outer block. The above join query is modified below with a subquery that selects only books with at least one sale during 2003 to illustrate this point.

---
```
Select
From    Books B, Reviews R
Where   B.isbn = R.isbn
And  B.isbn in
```

-continued

```
   (select isbn from Sales S
    Where year = 2003
    Currency bound 10 min on (S, B)
   )
Currency bound 10 min on (B,R)
```
---

When constructing the currency clause for the subquery, it should be decided whether S (in the inner block) needs to be consistent with B and/or R (in the outer block). To express that S needs to be consistent with B, B is added to the same consistency group as S, as in the above example. Because the outer currency clause requires that R be consistent with B, it follows that B, R, S must all be consistent, such that they all form a single consistency class. If the inner currency clause was changed to "5 min on (S, B)" both currency constraints must be satisfied, which means that we can only use inputs that satisfy the constraint "5 min on (S, B, R)"; that is the least upper bound of the two constraints. To express that S need not be consistent with any tables in the outer block, the reference to B is omitted and the inner currency clause is changed to "10 min on S".

Even though not explicitly stated, current database systems provide an important guarantee on sequences of queries: time moves forward. If a user reads a row R twice (without the reads being part of the same transaction) and row R was updated after the first read and the change committed before the second read began, then the second read will see the updated version of R.

This behavior follows from the fact that queries use the latest committed database state. However, if queries are allowed to use out-of-date replicas and have different currency bounds, there is no automatic guarantee that perceived time moves forward. If queries Q1 and Q2 are executed in the given order against snapshots S1 and S2, S2 is not automatically younger than or equally old as S1. The ordering has to be explicitly enforced. In the described embodiment, the forward movement of time is not enforced by default and has to be explicitly specified by bracketing the query sequence by "begin timeordered" and "end timeordered". This guarantees that later queries do not use older snapshots than queries earlier in the sequence.

This timeline consistency feature is useful when two or more of the queries in a sequence have overlapping input data. In that case counterintuitive results may be obtained if a later query were to use older data than the first query. It should be noted that users may not see their own changes when timeline consistency is not specified because a later query may use a replica that has not yet been updated.

Implementation in SQL Server

The following description is based on a specific implementation of the present invention for SQL Server, however, it will be appreciated by one of skill in the art that the present invention can be implemented in any database system.

The techniques for enforcing currency, consistency, and timeline constraints will be described herein in the context of MTCache, which is a mid-tier database cache solution for Microsoft SQL Sever. MTCache is based on the following approach.

A shadow database is created on the MTCache server that contains the same tables as the backend database, including constraints, indexes, views, and permissions, but all tables are empty. However, the statistics maintained on shadow tables, indexes and materialized views reflect the data on the backend server. What data to cache is defined by creating materialized views on the MTCache server. These materialized views may be selections and projections of tables or materialized views on the backend server. The materialized views on the MTCache server are kept up to data by SQL Server transactional replication. When a view is created, a matching replication subscription is automatically created and the view is populated. All queries are submitted to the MTCache server whose optimizer decides whether to compute a query locally, remotely or part locally and part remotely. All inserts, deletes, and updates are submitted to the MTCache server, which than transparently forwards them to the backend server.

The MTCache prototype supports queries with currency and consistency constraints. Which views are mutually consistent, i.e., reflect the same database state, and the currency of their data is tracked. The optimizer is extended to select the best plan taking into account the query's currency and consistency constraints and the status of applicable local materialized views. The selected plan might be a remote query, a local plan, or a mixed plan.

A query plan includes runtime checking of the currency of every local view used in the plan. Depending on the outcome of this check, the plan switches between using the local view or submitting a remote query. The result returned to the user is guaranteed to satisfy the query's currency and consistency constraints.

To enforce currency constraints, plans use SwitchUnion operators. A SwitchUnion operator has N+1 input expressions. When opening the operator, one of the first N inputs is selected and all rows are taken from that input; the other N−1 inputs are not touched. Which input to select is determined by the last input expression, here called the selector expression. The selector is a scalar expression returning a number in the range 0 to N−1. The selector expression is first evaluated and the number returned determines which one among the first N inputs to execute. The SwitchUnion operator is used to transparently switch between retrieving data from a local view (160 FIG. 2) and retrieving it by a distributed query to the backend server (remote data source 180 FIG. 2). The selector expression checks whether the local view is sufficiently up-to-date to satisfy the query's currency constraint.

Currency Regions

To keep track of which views are mutually consistent and their data freshness, local materialized views are grouped into currency regions. Each view belongs to a currency region and all views within the same region must be mutually consistent at all times, that is, they always reflect the same database state. This grouping can be seen in FIG. 2 in the local data source 160 and its three currency regions 161, 165, 168 each having a set of materialized views 163 and 162, 166, and 170 and 169, respectively. Two views cannot be placed in the same consistency region unless the view maintenance mechanism used guarantees that they are always kept consistent. Currency information is managed, and update propagation is carried out at the unit of currency region. Each currency region has a unique identifier and has metadata needed for currency tracking and metadata describing the update propagation policy.

Which cached views belong to the same currency region is determined by the view maintenance mechanism used. MTCache uses SQL Server's transactional replication. Updates are propagated to a cached view by a distribution agent. (An agent is a process or thread that wakes up regularly and checks for work to do). Multiple views may be assigned to the same agent. The agent applies updates to all affected views, one transaction at a time, in commit order. This means that all cached views that are updated by the same agent are mutually consistent, always reflect a committed state, and, consequently, can form a currency region.

The described embodiment does not implement currency regions as separate database objects. Instead three columns are added to the catalog entries describing views: cid, update_interval, and update_delay. Cid is the id of the currency region to which the view belongs. Update_interval is how often the agent propagates updates to this region. Update_delay is the delay for an update to be propagated to the front-end, i.e., the minimal data staleness this region can guarantee. These three columns are used by the query optimizer 120 during query optimization, but not necessarily during execution.

The mechanism for tracking data freshness is based on the idea of a heartbeat. A global heartbeat table is maintained at the back-end that contains one row for each currency region. The table has two columns: a currency region id and a timestamp column. The row in the heartbeat table for each of the three currency regions in FIG. 2 is shown functionally as associated with the region itself as 164, 175, 177. At regular intervals, such as every 2 seconds, the region's heart "beats", simply meaning that the timestamp column of the region's row is set to the current time by a stored procedure. Another possible design is to use a heartbeat table with a single row that is common to all currency regions but this precludes having different heartbeat rates for different regions.

Each currency region replicates its row from the global heartbeat table into a local heartbeat table for that region. The agent corresponding to the currency region wakes up at regular intervals and propagates all changes, including updates to the heartbeat table. Hence, the timestamp value in a region's local heartbeat table provides a bound on the staleness of the entire region's data. If the timestamp value found in the region's local heartbeat table is T, it is known that all updates up to time T have been propagated. If the current time is t, the region's data reflect a database state no older than t−T.

Enforcing Currency and Consistency Requirements

Figure 3:
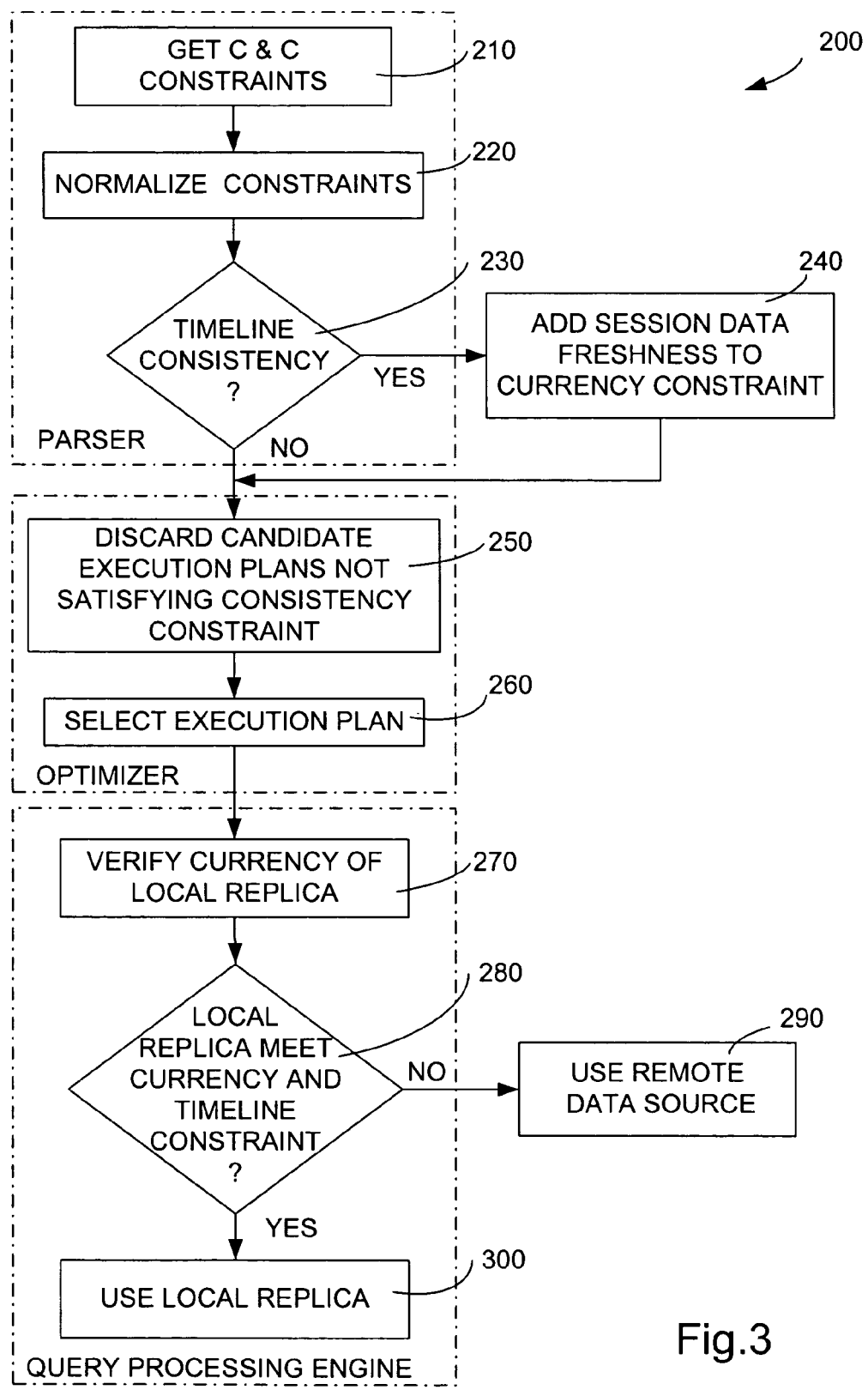
FIG. 3 is a flowchart outlining a method for specifying and enforcing currency and consistency requirements according to one embodiment of the present invention.

In the described embodiment, consistency requirements are checked at optimization time and currency requirements are checked at run time with the goal of evaluating as many queries as possible using the local data source 160. FIG. 3 outlines a method 200 that can be used to enforce currency and consistency requirements. Currency and consistency constraints are passed, as part of a query to the suitably extended SQL parser at 210. The information is captured, table/view names resolved and each clause converted into a currency and consistency constraint C that is a set of tuples, $c=\{b_1, S_1, \ldots, <b_n, S_n>\}$. Each S1 is a set of input operands (table or view instances) and $b_i$ is a currency bound specifying the maximum acceptable staleness (age) of the input operands.

Because currency and consistency constraints are sets of tuples, constraints from different clauses can be trivially combined by taking their union. At 220 all constraints are unioned together by the constraint normalizer (115 in FIG. 2) to end up with a single constraint. The resulting constraint is then converted to a normalized form that contains no redundant or contradictory requirements. A normalized currency and consistency constraint has input operands (in the sets $S_i$) that are all base tables and input operand sets $S_1, \ldots, S_n$ that are non-overlapping. An algorithm to normalize a currency and consistency constraint follows:

```
Algorithm: NormalizeConstraint
INPUT:    A currency and consistency constraint C
OUTPUT:   An equivalent normalized currency and consistency
          constraint C'
C' = C;
// Step 1: Eliminate references to views
For each tuple <c, S> in C' do
    While exists v ∈ S such that v is a view
        Replace v in S by the input operands of
        the view expression
    End
// Step 2: Combine overlapping tuples
While exist p₁ = <c₁, S₁> and p₂= < c₂, S₂>
⊠
    In C' such that S₁ ∩ S₂ ≠0 do
    p   =   <min(c₁, c₂),   (S₁ ∪ S₂)>
    Delete p₁ and p₂ from C'
    Add p to C'
End
// Step 3:  Add default requirement
S = all input operands of the query that are
    not included in C' ;
if S ≠ 0 then
    add the tuple <0,    S> to C' ;
end
```

Step 1 of the algorithm expands all references to views into references on base tables. Step 2 merges all tuples that have one or more input operands in common. The input operands referenced in a tuple must all be from the same database snapshot. It follows that if two different tuples have any input operands in common, they must all be from the same snapshot and snapshot must satisfy the tighter of the two bounds. Step 2 applies this transformation repeatedly until all tuples are disjoint. Step 3 adds a default requirement on all input operands not yet covered. For this embodiment, the input operands are required to be consistent and from the latest snapshots, i.e., fetched from the backend database. This tight default has the effect that queries without an explicit currency clause will be sent to the backend server and their result will reflect the latest database state.

Compile-Time Consistency Checking

Now that the currency and consistency constraints have been normalized, they are checked to establish if timeline consistency has been specified at 230. Timeline consistency will be described in greater detail below. The normalized constraints are passed along with the parsed query to the optimizer (120 in FIG. 2) which includes a plan consistency verifier (125 in FIG. 2) that evaluates candidate execution plans generated by the optimizer for consistency as specified in the currency and consistency constraint at 250.

Generally speaking, a query optimizer generates all possible rewritings of a query expression, estimates their costs, and chooses the one with the lowest cost. The described embodiment uses a transformation-based optimizer, i.e., the optimizer generates rewritings by applying local transformation rules on subexpressions of the query. Applying a rule produces substitute expressions that are equivalent to the original expression. Operators (and expressions) are of two types: logical and physical. A logical operator specifies what algebraic operation to perform, for example, a join, but not what algorithm to use. A physical operator also specifies the algorithm, for example, hash join or merge join. Optimization proceeds in two phases: an exploration phase and an optimization phase. The exploration phase generates new logical expressions. The optimization phase recursively finds the best physical plan which is the best way of evaluating the query.

Physical plans are therefore built bottom-up, producing plans for larger and larger subexpresions.

Required and delivered (physical) plan properties play an important role during optimization. For example, one of these properties is the sort property. A merge join operator requires that its inputs be sorted on the join columns. To ensure this, the merge join passes down to its input a required sort property (a sequence of sort columns and associated sort order). In doing so, the merge join operator seeks the cheapest plan for the input that produces a result sorted on the specified columns. Every physical plan includes a delivered sort property that specifies if the result will be sorted and, if so, on what columns and in what order. Any plan whose delivered properties do not satisfy the required properties is discarded. Among the qualifying plans, the one with the lowest estimated cost is selected at 260. The plan consistency verifier checks consistency during optimization so that the plan produced by the optimizer is guaranteed to produce a result that satisfies the query's consistency constraint. The implementation is built on the optimizer's plan property mechanism.

The query's required consistency property consists precisely of the normalized consistency constraint described above that has been constructed from the query's currency clause. The constraint is attached as a required plan property to the root of the query plan and the property is inherited recursively by its children.

A delivered consistency property consists of a set of tuples $\{<R_i, S_i>\}$ where $R_i$ is the id of a currency region and $S_i$ is a set of input operands, namely, the set of input operands (tables or materialized views) of the current expression that belong to region $R_i$. The remote data source (180 in FIG. 3) is designated as a special currency region and all input operands located on the backend server belong to this region.

Delivered plan properties are computed bottom-up. Each physical operator (select, hash join, merge join, etc.) computes what plan properties it delivers given the properties of its inputs. According to their characteristics, the physical operators can be divided into four categories, each using a specific algorithm to compute the delivered consistency property. Below the method for deriving the delivered consistency for each category of physical operator is outlined in pseudo code.

```
PROCEDURE   DeriveDeliveredConsistency
INPUT:      Table scan or Index scan operator
OUTPUT      Delivered currency property CP
R = Region id of input operand;
If input operand is a view then
    T = set of ids of view's input operands;
Else
    T = id of input operand
CP = {<R,    T>};
Return CP
```

The above algorithm applies to table or index scan operators. If the input operand is a base table (or an index on a base table), the id of the table and the id of its currency region are returned. Consistency properties always refer to base tables. Hence if a materialized view is scanned, the ids of its input tables are returned to be consistent with required properties.

Other operators with a single relational input such as filter, project, aggregate, and sort do not affect the delivered consistency property and therefore copy the property from the relational input.

Join operators (nested-loop, hash, and merge) combine two input streams into a single output stream. In the same way the consistency property of the output is computed from the consistency properties of the two (relational) children as shown below. If the two children have no inputs from the currency region, the output property is the union of the two child properties. If they have two tuples with the same region id, the input sets of the two tuples are merged.

```
PROCEDURE   DeriveDeliveredConsistency
INPUT           Join operator
OUTPUT:         Delivered consistency property CP
CP = first child's consistency property;
For each phrase <C, S₁> in second child's consistency
property do
//Merge phrases from the same region
    If there exists a phrase q = <C, S₂> in CP
        then update q to <C, (S₁ ∪ S₂)>;
        else add <C, S₁> to CP;
    end;
return CP;
```

The SwitchUnion operator has multiple relational children but it does not combine them in any way. It selects one of the children as the source for all tuples. To derive the delivered consistency of a SwitchUnion operator it is first observed that it can only be guaranteed that two input operands are consistent if they are consistent in all children (because any one of the children may be chosen). The algorithm below computes a partitioning of the input operands such that each partition is a subset of some "child" partition in each input to the SwitchUnion and assigns each result partition a region id.

```
PROCEDURE   DeriveDeliveredConsistency
INPUT:      SwitchUnion operator
OUTPUT:     Delivered consistency property CP
CP = first child's consistency property;
For each of the other relational children do
    CPN = 0
    CPC = child's currency property ;
    For each currency phrase <C, S> in CPC do
        CPT = IntersectByPhrase (CP, <C,S>)
        Add CPT to CPN;
    end
    CP=CPN
end
return CP
ALGORITHM   IntersectByPhrase
INPUT:      CP consistency property;
            P = < C₁, S₁ > currency phrase
OUTPUT:     CPN consistency property
CPN = 0
For each phrase Q =<C₂, S₂> in CP such that S₁ ∩ S₂) ≠ 0 do
// retain if identical
If S₁= S₂ and
    then add <C₁, S₁> to CPN ;
    else
    begin
        if C₁ = C₂
            then C = C₁;
            else
// local is weaker than remote
            if C₁ is a remote region
                then C = C₂;
                else
                if C₂ is a remote region
                    then C = C₁
                    else C = new dummy region id;
        add <C,  (S1 ∩ S2)> to CPN
    end
end
return CPN;
```

The algorithms above are used to derive the consistency property of each operator in a plan. Plans are built bottom-up, one operator at a time. As soon as a new root operator is added to the plan, the optimizer checks wither the resulting plan satisfies all required properties. If not the plan, i.e., the new root operator is discarded. The new consistency property is included in the framework.

The consistency model applied does not allow two columns from the same input table T to originate from different snapshots. It is possible to generate a plan that produces a result with this behavior. If there are two (local) projection views of T that belong to different currency regions R1 and R2 and cover different subsets of columns from T. A query that requires columns from both views could then be computed by joining the two views. The delivered consistency property for this plan would be $\{<R1, T>, <R2, T>\}$, which is not allowed by the current consistency model. Said another way, a delivered consistency property CPd is conflicting if there exist two tuples $<R_i,S_i>$ and $<R_j,S_j>$ in CPd such that $S_i \cap S1_j \neq 0$ and $R_i \neq R_j$.

A consistency constraint specifies that certain input operands must belong to the same region (but not which region). It can be verified that a complete plan satisfies the constraint by checking that each required consistency group is fully contained in some delivered consistency group. This observation produces the following rule for checking consistency satisfaction of a complete plan: a delivered consistency property CPd satisfies a required consistency constraint CCr if and only if (1) CPd is not conflicting and (2) for each tuple $<B_r, S_r>$ in CCr, there exists a tuple $<R_d, S_d>$ in Cpd such that $S_r$ is a subset of $S_d$.

This rule can only be applied to complete plans because a partial plan may not include all input operands covered by the consistency constraint. A rule is therefore needed that allows a partial plan that does not satisfy the given consistency constraint to be discarded as soon as possible. The following rule can be applied to partial plans to detect violations early: a delivered consistency property CPd violates a required consistency constraint CCr if (1) CPd is conflicting or (2) there exists a tuple $<R_d, S_d>$ in CPd that intersects more than one consistency class in CCr, such that there exist two tuples $<B1_r, S1_r>$ and $<B2_r,S2_r>$ in CCr such that $S_d \cap S1_r \neq 0$ and $S_d \cap S1_r \neq 0$.

Run-Time Currency Checking

Consistency constraints are enforced during optimization and currency (freshness) constraints are enforced during query execution. The optimizer produces plans that check whether a local view is sufficiently up to data and that switch between using a local view and retrieving the data from the backend server. The SwitchUnion operator is used for this purpose.

Figure 4:
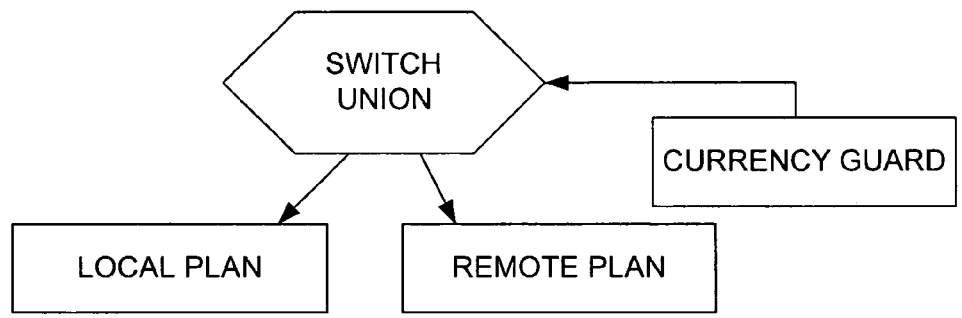
FIG. 4 is a logical block diagram outlining the functionality of a switch union operator that can be used to practice an embodiment of the present invention.

In the described embodiment, the local data is defined by materialized views. Logical plans making use of a local view are created through view matching, that is, the view matching algorithm finds an expression that can be computed from a local view and produces a new substitute exploiting the view. FIG. 4 illustrates a generic substitute plan that includes a SwitchUnion and currency guard.

Given a logical expression E and a matching view V from which E can be computed, if there are no currency constraints on the input table of E, view matching produces a "normal" substitute consisting of, at most, a select, a project and an aggregation operator on top of V. If there is a currency constraint, the view matching produces a substitute plan as shown in FIG. 4 consisting of a SwitchUnion on top with a selector expression that checks whether V satisfies the currency constraint and two input expressions: a local branch and a remote branch. The local branch is the "normal" substitute mention above and the remote plan consists of a remote SQL query created from the original expression E. If the selector expression, which is called the currency guard, evaluates to true at 270, 280 the local branch is chosen (300), otherwise the remote branch is chosen (290).

A region's data currency is tracked using a heartbeat mechanism that works as follows. The backend server contains a heartbeat table containing one row for each currency region. The table has two columns, RegionId (unique) and Timestamp. The Timestamp column of each row is set to the current time by a stored procedure that is executed at regular intervals. Each invocation of the stored procedure generates one "beat" of the "heart".

The cache server has a local heartbeat table for each currency region that contains a replica of the region's row from the heartbeat table on the backend server. The heartbeats for a region R are propagated in the normal way to the region's local heartbeat table. When the cache encounters a timestamp with time T in the heartbeat table for region R, it knows that the region's local views have received all updates up to time T. Hence if the current time is t, the cache can guarantee that the local views in region R are no older than t−T. In other words, t−T is a bound on the staleness of all data in region R.

The currency guard for a local view that belongs to region R is then an expression equivalent to the following SQL predicate:
Exists (select 1 from Heartbeat_R
   where TimeStamp>getdate( )−B)

Heartbeat_R is the local heartbeat table for region R and B is the applicable currency bound from the query.

Enforcing Timeline Consistency

Timeline consistency, if specified, is also enforced at run time. Timeline consistency can only be specified for a sequence of queries that belong to the same database session. A database system maintains state information about each session. To enable enforcement of timeline consistency, two variables are added to the session state, enforce_timeline_consistency, and freshest_data_used. The variable enforce_timeline_consistency is a Boolean variable that is set to true when the user has requested that timeline consistency be enforced. The variable freshest_data_used keeps track of the "age" of the freshest data used by any query within the session. When a query is evaluated, the system gets the currency timestamp for each local replica used by the query from the heartbeat table of the replica's currency region. The timestamp in the variable freshest_data_used is set to the maximum of its old value and the timestamps of the inputs.

Timeline consistency is then enforced by adding an additional condition to the currency guard predicate (see FIG. 3 at 230, 240) as shown in this SQL predicate:
Exists (select 1 from Heartbeat_R
   Where TimeStamp>getdate( )−B
   And TimeStamp<=freshest_used ( ))

Wherein the function freshest_used returns the value of the variable freshest_data_used for the current session. This predicate ensures that no local data used in the query is older than the freshest data used in any earlier queries within the session.

Cost Estimation

In most cases, using a local view is cheaper than issuing a remote query. Yet, there are cases where using the backend server turns out to be cheaper, possibly because there is a suitable index available on the backend server but not locally. Therefore, the optimizer (120 FIG. 2) selects a plan at 260 (FIG. 3) based on an estimated cost for the plan.

For a SwitchUnion used as a currency guard the cost is estimated as:

$$C = p \cdot c_{local} + (1-p) \cdot c_{remote} + c_{cg}$$

In the above equation p is the probability that the local branch is executed, $c_{local}$ is the cost of executing the local branch, $c_{remote}$ is the cost of executing the remote branch, and $c_{cg}$ is the cost of checking the currency guard.

Figure 5:
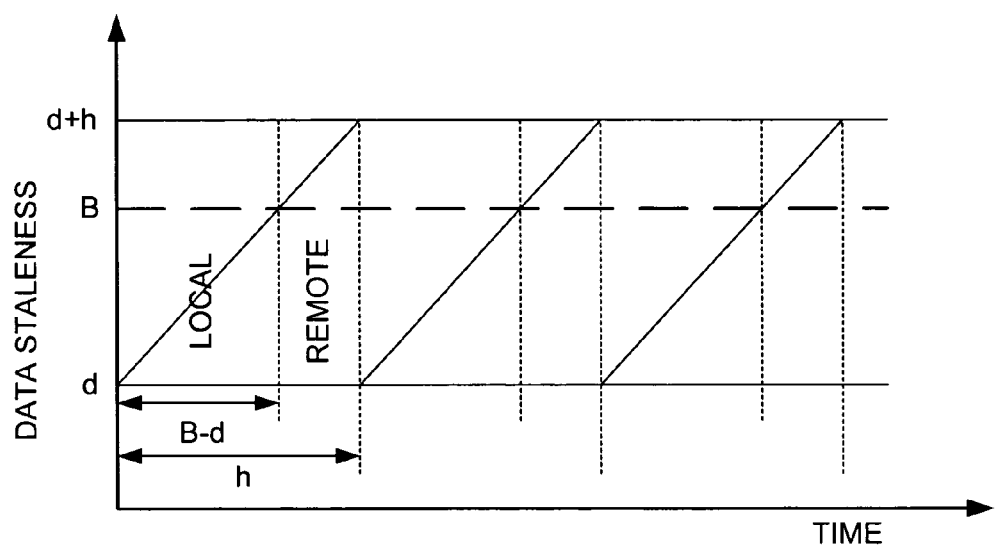
FIG. 5 is a graphical comparison of the currency state of data on local and remote data sources.

The cost estimates for the three inputs are computed in the normal way, but p is estimated in a different way. Intuitively, the higher the required currency bound and the more frequent the heartbeat, the more likely it is that the local branch will be used. Referring now to FIG. 5, the graph shows data staleness as a function of time. The interval between heartbeats is denoted as h and the propagation delay for a heartbeat as d. The staleness of the data in the local view goes through a cycle illustrated in FIG. 5. Immediately after a heartbeat has been propagated, the local data is not more than d out of date (the time it took to deliver the data). The staleness of the data then increases linearly with time to d+h when the next heartbeat is delivered and the staleness drops to d.

If a query specifies a currency bound of B, the case when d<B<d+h is illustrated in FIG. 5. The execution of the query is equally likely to begin at any point during a heartbeat cycle. If it begins somewhere in the interval marked "local", the local view satisfies the currency constraint and the local branch is chosen. The length of this interval is B−d and the total length of the cycle is h so the probability that the local branch will be chosen is (B−d)/h.

Two other cases must also be considered. If B<d, the local branch is never chosen because the local data is never sufficiently fresh so p=0. On the other hand, if B>d+h, the local branch is always chosen because the local data is always sufficiently fresh so in that case p=1. In summary, here is a formula that can be used for estimating p:

| | |
|---|---|
| p = 0 | if B − d ≤ 0 |
| p = (B − d)/h | if 0 ≤ B − d ≤ h |
| p = 1 | if B − d ≥ h |

The explanation above assumes that updates are propagated periodically. The case when updates are propagated continuously is correctly modeled by setting h=0 in the above formulas.

EXAMPLES

For the purposes of illustration, a sample database with two local views is used. The two local views are:
cust_prj(c_custkey, c_name, c_nationkey, c_acctbal)
orders_prj(o_custkey, o_orderkey, o_totalprice), which are projections of a Customer and an Orders table on the backend server, respectively. Cust_prj has a clustered index on the primary key c_custkey and orders_prj has a clustered index on (o_custkey, o_orderkey). There are no secondary indexes. The views are in different currency regions and, hence not guaranteed to be consistent. The region's heartbeat intervals and delays are shown in FIG. 6a.

FIG. 6b shows the query schemas used in the example. Different query instances are obtained by varying the parameter $K and the currency clause in S1 for Q1 to Q5; $A and $B in S2 for Q6 and Q7. The parameter values used are shown in FIG. 6c with a corresponding logical plan listed in the right column. FIGS. 7a-7e illustrate the different plans selected by the optimizer depending on the query's currency clause.

If a currency clause is not included in the query, the default requirements apply: all inputs must be mutually consistent and the currency bound equals zero. Q1 and Q2 do not include a currency clause. Since local data can never satisfy the currency requirement, remote queries were generated for Q1 and Q2. Because of the highly selective predicate in Q1, the optimizer selected plan 1 (7a) which sends the whole query to the backend. For Q2 plan 2 (7b) was selected which contains a local join and two remote queries, each fetching a base table. In this case it is better to compute the join locally because the join result is significantly larger than the sum of the two input tables. Customers have 10 orders on average so the information for a customer is repeated 10 times in the join result.

Remote plan 1 (7a) was generated for Q3 because the local views cust_prj and orders_prj satisfy the currency bounds but not the consistency requirement because they are in different currency regions. In Q4 the consistency requirement is relaxed between Customer and Orders and the currency bounds were also changed. The local views now satisfy the consistency requirement and orders_prj also satisfies the currency bound but cust_prj will never be current enough to be useful. Thus a mixed plan, plan 3 (7c) was selected by the optimizer. If the currency bound is further relaxed on Customer as in Q5 both local views become usable and plan 4 (7d) is selected. Q3, Q4, and Q5 show how changing the currency can drastically change the query plan. As can be seen in FIG. 7, every local data access is protected by a currency guard, which guarantees that local data that is too stale will never be used.

Optimization is entirely cost based. One consequence of this is that the optimizer may choose not to use a local view even though it satisfies all requirements if it is cheaper to get the data from the backend server. This is illustrated by Q6 and Q7. Even though they differ only in their range predicates, the optimizer chooses different plans for them. For Q6 a remote query was chosen even thought the local view cust_prj satisfied the currency requirement. The reason is the lack of a suitable secondary index on cust_prj while there is one at the backend server. The range predicate in Q6 is highly selective so the index on c_acctbal at the backend is very effective, while at the cache the whole view would have to be scanned. When the range is increased, as in Q7, the benefit of an index scan over a sequential scan diminishes and a plan exploiting the local view is chosen.

Exemplary Operating Environment

Most typically, the database query processing system 100 described above is constructed in software executing on a computer system 20 (FIG. 1) such as a server computer which in turn is coupled to other servers or computers on a network. A computer system 20 in conjunction with which the query processing system can be utilized is depicted in FIG. 1 and described in greater detail below.

Figure 1:
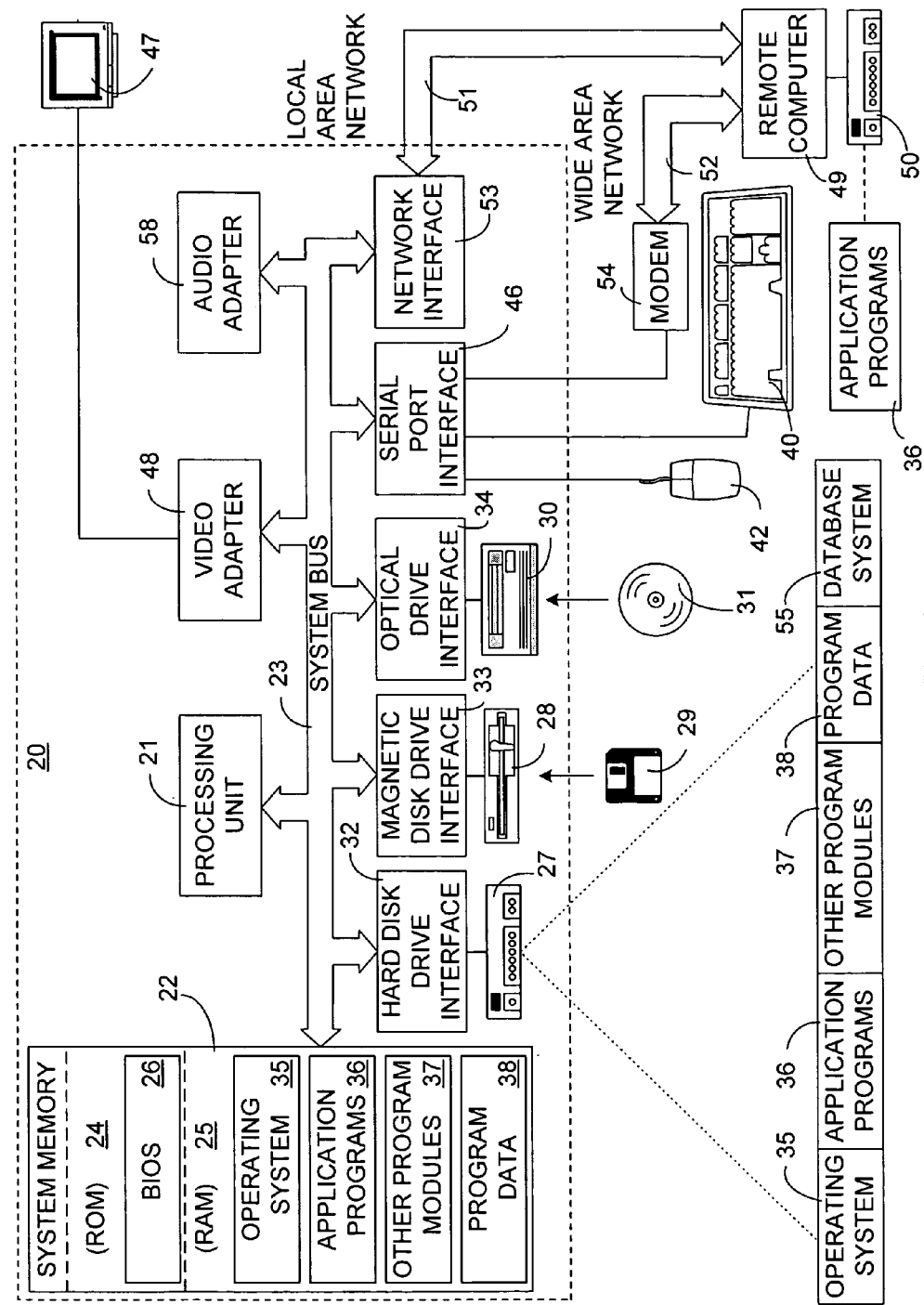
FIG. 1 is an example of an operating environment for practicing one embodiment of the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disc drive 30 for reading from or writing to a removable optical disc 31 such as a CD ROM or other optical media. Hard disk drive 27, magnetic disk drive 28, and optical disc drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disc 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disc 31, ROM 24 or RAM 25, including an operating system 35, one or more application programs 36, other program modules 37, and program data 38. A database system 55 may also be stored on the hard disk, magnetic disk 29, optical disc 31, ROM 24 or RAM 25. A user may enter commands and information into personal computer 20 through input devices such as a keyboard 40 and pointing device 42. Other input devices may include a microphone, stylus, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other equipment for establishing communication over a wide area network 52, such as the Internet. Modem 54, which may be internal or external, is connected to system bus 23 via serial port interface 46 or a broadband connection. In a networked environment, program modules depicted relative to personal computer 20, or portions thereof, may be stored in remote memory storage device 50. It will be appreciated that the network connections shown are exemplary and other ways of establishing a communications link between the computers may be used.

As can be seen by the foregoing description, providing a protocol for specifying currency and consistency constraints as part of a query on a database, generating query plans that meet the consistency requirement and validating data currency at execution time can allow queries to be executed on local data sources when possible while guaranteeing that the currency and consistency requirements are met.

We claim:

1. A computer system that enforces user specified currency constraints on a query on a database system having a query optimizer, a query processing engine and one or more local replicas of data in remote data sources, the computer system comprising:

at least one memory; and at least one processing unit, comprising:

a constraint parser that interprets and converts the user specified currency constraints into forms usable by the query optimizer, wherein at least one individual user specified currency constraint includes a consistency constraint and the constraint parser parses the consistency constraint;

a query plan generator that constructs a query plan for executing the query, wherein the query plan includes one or more subplan selection operators that check a currency of an individual local replica against the at least one individual user specified currency constraint and selects a subplan using the individual local replica only when the at least one individual user specified currency constraint is met;

wherein the query processing engine executes the query plan, including the one or more subplan selection operators, thereby producing a result that satisfies the query's currency constraints; and a heartbeat mechanism that includes a global heartbeat table and local replicated heartbeat tables that keep track of at least one individual local replicas currency.

2. The computer system of claim 1 comprising a currency constraint normalizer that resolves a plurality of the user-specified currency constraints into a single constraint representing a least upper bound of the plurality of the user specified currency constraints.

3. The computer system of claim 1 wherein tables in the individual local replica are grouped into currency regions and wherein data in tables in a currency group correspond to a same database state.

4. The computer system of claim 1 wherein a data source selection operator accesses a local heartbeat table to determine whether the currency of the local replica meets the at least one individual user specified currency constraint.

5. The computer system of claim 1 wherein the query optimizer estimates a cost associated with the query plan or at least one other query plan to be executed using the individual local replica based on a probability that the individual local replica will meet the at least one individual user specified currency constraint.

6. The computer system of claim 1 wherein the query plan generator verifies possible query plans against the consistency constraint and rejects individual possible query plans that do not meet the consistency constraint.

7. The computer system of claim 1 comprising a consistency constraint normalizer that resolves a plurality of consistency constraints comprising the consistency constraint and one or more other consistency constraints into a single consistency constraint representing a least upper bound of the plurality of constraints.

8. The computer system of claim 1 comprising a timeline consistency constraint generator that appends the user specified currency constraint or at least one other currency constraint with a session data age such that data in the local replica must be older than the session data age.

9. The computer system of claim 6 wherein the query plan generator derives a delivered consistency property for the query plan or at least one other query plan based on physical operators in the query plan the or at least one other query plan and compares the delivered consistency with the query's consistency constraint.

10. The computer system of claim 6 wherein tables in a local data source are grouped into currency regions and wherein the query plan generator verifies that inputs in the query plan or at least one other query plan that must be consistent belong to the same currency region.

11. A method comprising:

parsing a user specified constraint associated with a query, wherein the user specified constraint comprises a currency constraint and a consistency constraint and is stored in a memory to interpret and convert the user specified constraint into a form usable by a query optimizer;

constructing query execution plans that include a subplan selection operator of a subplan that verifies a currency of a local replica against the currency constraint and selects the subplan using the local replica only when the local replica's data meets the currency constraint;

verifying the query execution plans against the consistency constraint and rejecting individual query execution plans that do not meet the consistency constraint;

executing the query plan, including the subplan selection operator, thereby producing a result that satisfies the currency constraint and the consistency constraint; and maintaining global and locally replicated logs of an update status of individual currency regions associated with the local replica or at least one other local replica.

12. The method of claim 11 comprising resolving a plurality of currency and consistency constraints associated with the query into a single currency and consistency constraint that represents a least upper bound of the plurality of currency and consistency constraints.

13. The method of claim 12 comprising grouping tables of the local replica or the at least one other local replica into the individual currency regions, wherein at least one individual currency region's one or more tables comprise data that corresponds to a same database state.

14. The method of claim 13 wherein the subplan selection operator refers to information in a log to verify the currency of the local replica.

15. The method of claim 13 wherein possible query plans are evaluated by determining a delivered consistency based on physical operators that group input tables into sets of consistent input tables and verify that the input tables in a set of consistent input tables belong to a same currency region.

16. The method of claim 11 comprising estimating a cost associated with the query plan or another query plan to be executed using a certain local replica based on a probability that the certain local replica will meet the currency constraint of the query.

17. Computer-readable media comprising computer-executable instructions for performing the method of claim 11.

18. One or more computer readable media comprising computer-executable instructions for enforcing user specified currency constraints on a query on a database system, wherein the database system has local replicas of data in remote data sources, the computer-executable instructions comprising:
   interpreting and converting an individual user specified currency constraint into a form usable by a query optimizer, wherein the individual user specified currency constraint includes a consistency constraint;
   parsing the consistency constraint;
   constructing a query plan for executing the query, wherein the query plan includes a subplan selection operator that checks a currency of a local replica against the individual user specified currency constraint and selects a subplan using the local replica when the individual user specified currency constraint is met;
   executing the query plan, including the subplan selection operator, thereby producing a result that satisfies the individual user specified currency constraint; and
   grouping tables in local data sources into currency regions, wherein individual tables within an associated currency region include data that corresponds to a same database state.

19. The one or more computer readable media of claim 18 wherein the computer-executable instructions further comprise resolving a plurality of currency constraints into a single constraint that represents a least upper bound of the plurality of currency constraints.

20. The one or more computer readable media of claim 18 wherein the computer-executable instructions further comprise utilizing a heartbeat mechanism to maintain a global heartbeat table and local replicated heartbeat tables that track individual currencies of individual local replicas.

21. The one or more computer readable media of claim 20 wherein the subplan selection operator accesses an individual local replicated heartbeat table to determine whether an individual local data sources currency meets the individual user specified currency constraint.

22. The one or more computer readable media of claim 18 wherein the computer-executable instructions further comprise estimating a cost associated with the query plan or at least one other query plan to be executed using a certain local replica based on a probability that the certain local replica will meet the individual user specified currency constraint.

23. The one or more computer readable media of claim 18 wherein the computer-executable instructions further comprise verifying possible query plans against the consistency constraint and rejecting one or more of the possible query plans that do not meet the consistency constraint.

24. The one or more computer readable media of claim 23 wherein the computer-executable instructions further comprise resolving a plurality of individual consistency constraints into a single consistency constraint that represents a least upper bound of the plurality of individual consistency constraints.

25. The one or more computer readable media of claim 18 wherein the computer-executable instructions comprise deriving a delivered consistency property for the query plan or at least one other query plan based on physical operators in the query plan or the at least one other query plan and comparing the delivered consistency property with the consistency constraint.

26. An apparatus comprising:
   means for interpreting and converting a user specified currency constraint associated with a query into a form usable by a query optimizer, wherein the user specified currency constraint includes a consistency constraint;
   means for interpreting and converting the consistency constraint;
   means for constructing a query plan for executing the query, wherein the query plan includes a subplan selection operator that checks a currency of a local replica against the user specified currency constraint and selects the subplan using the local replica only when the user specified currency constraint is met;
   means for executing the query plan, including the subplan selection operator, thereby producing a result that satisfies the query's currency requirements; and
   means for grouping individual tables in local data sources into currency regions utilizing a heartbeat mechanism to maintain a global heartbeat table and local replicated heartbeat tables configured to track individual currencies of individual local replicas.

27. The apparatus of claim 26 further comprising means for resolving a plurality of currency constraints into a single constraint that represents a least upper bound of the plurality of currency constraints.

28. The apparatus of claim 26 wherein individual tables' data within a currency region corresponds to a same database state.

29. The apparatus of claim 28 wherein the subplan selection operator accesses at least one of the local replicated heartbeat tables or another local heartbeat table to determine whether a currency of an individual local data source meets the user specified currency constraint.

30. The apparatus of claim 26 further comprising means for estimating a cost associated with an individual query plan to be executed using the local replica or at least one other local replica based on a probability that the local replica or the at least one other local replica will meet the user specified currency constraint.

31. The apparatus of claim 26 further comprising means for verifying possible query plans against the consistency constraint and rejecting query plans that do not meet the consistency constraint.

32. The apparatus of claim 31 further comprising means for resolving a plurality of consistency constraints into a single consistency constraint that represents a least upper bound of the plurality of consistency constraints.

33. The apparatus of claim 26 further comprising means for deriving a delivered consistency property for one or both of the query plan or at least one other query plan based on physical operators in the query plan or at least one other query plan and comparing the delivered consistency property with the query's consistency constraint.

* * * * *